(12) United States Patent
Jiang et al.

(10) Patent No.: US 9,280,516 B2
(45) Date of Patent: Mar. 8, 2016

(54) METHOD AND SYSTEM TO VALIDATE WIRED SENSORS

(75) Inventors: Jin Jiang, London (CA); Qingfeng Li, London (CA)

(73) Assignee: THE UNIVERSITY OF WESTERN ONTARIO, London, Ontario (CA)

(*) Notice: Subject to any disclaimer, the term of this patent is extended or adjusted under 35 U.S.C. 154(b) by 790 days.

(21) Appl. No.: 13/440,339

(22) Filed: Apr. 5, 2012

(65) Prior Publication Data

US 2013/0103350 A1     Apr. 25, 2013

Related U.S. Application Data

(60) Provisional application No. 61/472,993, filed on Apr. 7, 2011.

(51) Int. Cl.
| | | |
|---|---|---|
| *G06F 17/00* | (2006.01) | |
| *H04L 29/08* | (2006.01) | |
| *H04Q 9/00* | (2006.01) | |
| *H04W 4/00* | (2009.01) | |
| *H04W 24/04* | (2009.01) | |
| *H04W 84/18* | (2009.01) | |

(52) U.S. Cl.
CPC ............... *G06F 17/00* (2013.01); *H04L 67/12* (2013.01); *H04Q 9/00* (2013.01); *H04Q 2209/30* (2013.01); *H04Q 2209/40* (2013.01); *H04Q 2209/86* (2013.01); *H04W 4/006* (2013.01); *H04W 24/04* (2013.01); *H04W 84/18* (2013.01)

(58) Field of Classification Search
CPC .......... G06F 17/00; H04L 67/12; H04Q 9/00; H04Q 2209/40; H04Q 2209/30; H04Q 2209/86; H04W 4/006; H04W 24/04; H04W 84/18

See application file for complete search history.

(56) References Cited

U.S. PATENT DOCUMENTS

| | | |
|---|---|---|
| 3,115,453 A | 12/1963 | Paget et al. |
| 3,976,540 A | 8/1976 | Sowa |
| 3,976,543 A | 8/1976 | Sowa |

(Continued)

OTHER PUBLICATIONS

Dorr et al., "Detection, Isolation, and Identification of Sensor Faults in Nuclear Power Plants" IEEE Transactions on Control Systems Technology, vol. 5, No. 1, Jan. 1997.*

(Continued)

*Primary Examiner* — Alexander Satanovsky
*Assistant Examiner* — John Kuan
(74) *Attorney, Agent, or Firm* — Brion Raffoul

(57) ABSTRACT

The present invention provides a method and system using wireless sensors to validate wired sensors used in applications where the requirements on the reliability of wired sensors are stringent. A computing means periodically collects measurements for each variable from the wired and wireless sensors and compares them against an expected value. The expected value is a weighted average of all the measurements for a variable, in which the weight assigned to the measurement from each sensor is determined according to both its reliability and accuracy. As such, measurements are compared with the corresponding expected value for a particular variable. If the difference between a measurement and its corresponding expected value is found to be unacceptable, the validation computer will generate a corresponding alert. Application examples include 1) validating wired sensors used in safety shutdown systems for industrial facilities and 2) validating wired sensors used to monitor storage tanks.

15 Claims, 6 Drawing Sheets

(56) References Cited

U.S. PATENT DOCUMENTS

| | | | |
|---|---|---|---|
| 4,304,632 A | 12/1981 | Bhate et al. | |
| 4,405,558 A | 9/1983 | Mangus et al. | |
| 5,073,334 A | 12/1991 | Saito et al. | |
| 5,531,402 A | 7/1996 | Dahl | |
| 5,832,411 A * | 11/1998 | Schatzmann et al. | 702/23 |
| 6,123,093 A * | 9/2000 | D'Antonio et al. | 137/78.3 |
| 6,236,334 B1 | 5/2001 | Tapperson et al. | |
| 6,252,510 B1 * | 6/2001 | Dungan | 340/632 |
| 6,389,321 B2 | 5/2002 | Tang et al. | |
| 6,392,536 B1 * | 5/2002 | Tice et al. | 340/506 |
| 6,532,550 B1 * | 3/2003 | Crew et al. | 714/11 |
| 6,853,887 B1 | 2/2005 | Greenwell | |
| 7,102,504 B2 * | 9/2006 | Kates | G08B 25/009 340/286.01 |
| 7,200,469 B2 | 4/2007 | Katrak et al. | |
| 7,359,702 B2 | 4/2008 | Kirkpatrick | |
| 2005/0210340 A1 * | 9/2005 | Townsend et al. | 714/701 |
| 2006/0282580 A1 * | 12/2006 | Russell et al. | 710/62 |
| 2007/0152813 A1 * | 7/2007 | Mathur et al. | 340/539.22 |
| 2008/0074276 A1 * | 3/2008 | Valencia et al. | 340/635 |
| 2012/0078544 A1 * | 3/2012 | Lynch et al. | 702/56 |
| 2012/0090392 A1 * | 4/2012 | Liu et al. | 73/295 |

OTHER PUBLICATIONS

Deyst, Jr. et al., "Sensor Validation: A Method to Enhance the Quality of the MAN/Machine Interface in Nuclear Power Stations" IEEE Transactions on Nuclear Science, vol. NS-28, No. 1, Feb. 1981.*

Bickford et al., "Real-Time Sensor Data Validation for Space Shuttle Main Engine Telemetry Monitoring" American Institute of Aeronautics & Astronautics 1999.*

Lin et al., "Wireless Sensor Networks Solutions for Real Time Monitoring of Nuclear Power Plant" Proceedings of the 5th World Congress on intelligent Control and Automation. Jun. 15-19, 2004, Hangzhou. P.R. China.*

A. Kadri et al., "Low-Power Chirp Spread Spectrum Signals for Wireless Communication Within Nuclear Power Plants", Nuclear Technology, vol. 166, May 2009, 156-169.

Training Centre/Centre De Formation, "Candu Shutdown Systems", 1-54, Jan. 1996.

* cited by examiner

METHOD AND SYSTEM TO VALIDATE WIRED SENSORS

RELATED APPLICATIONS

This application claims priority on U.S. Patent Application Ser. No. 61/472,993 filed Apr. 7, 2011.

FIELD OF THE INVENTION

The present invention relates to a system and method using wireless sensors to validate wired sensors.

BACKGROUND OF THE INVENTION

Wired sensors are used in many applications for the purpose of safety shutdown, control, and/or monitoring. A sensor usually measures a physical variable, e.g., temperature, pressure, level, or flow rate, and converts it into an electrical signal. The electrical signal may then be processed by a transmitter and converted into a standard analog signal or digital network signal, sent over wires, and received and used by a device located a distance away.

The requirements for the reliability of the wired sensors in industrial settings can be extremely stringent. One application example of wired sensors is the safety shutdown systems for industrial facilities, e.g., nuclear power plants (NPPs). Safety shutdown systems are important for the industrial facilities, where system malfunctions can harm people, damage equipment, or be costly in a number of other ways. As such, these facilities require safety shutdown systems with high availability, which is heavily dependent on the reliability of the wired sensors used. The other application is the monitoring systems for the levels of liquid storage tanks used in safety-critical applications, e.g., fuel storage tanks for diesel power generators used in hospitals.

In NPPs, safety shutdown systems are responsible for terminating the nuclear chain of reaction in an emergency. Such a situation would arise if the system detected a serious undesirable state in, e.g., a reactor, a heat transport system, a pressurizer, or a steam generator. Exemplary scenarios include high neutron fluxes, high coolant temperatures, high steam generator water levels that may damage turbines, and low steam generator water levels that may damage steam generators. The decision of whether to shutdown the reactor is made based on the measurements from the wired sensors.

Shutdown of a nuclear reactor is usually achieved through insertion of shutdown rods or injection of liquid neutron absorbing poison into the reactor core. A NPP shutdown system typically includes three or four shutdown channels. Typically, the shutdown of the reactor is initiated following 2-out-of-3 or 2-out-of-4 decision logics. Shutdown logic is defined here as the logic by which shutdown decisions are made. Such logic design is intended to both improve the availability of the shutdown systems through redundancy and meanwhile reduce the spurious trip rate.

For each shutdown channel, a comparator obtains the measurements of trip variables from sensors and compares them with predefined limits to decide whether to issue a trip signal from this channel. Once the comparator determines that one or more trip variables have exceeded the predefined limits, the channel will be immediately tripped. In addition, an overriding system allows NPP operators to manually trip the channel if necessary.

The term, trip, is defined as meaning that the safety shutdown system acts to shutdown a facility, e.g., to shutdown the reactor in a NPP. If 2-out-of-3 logic is used, a particular facility is shutdown when at least two shutdown channels are tripped.

The following are examples of trip variables for the safety shutdown systems of NPPs:
  Neutron power;
  Rate of log neutron power;
  Primary heat transport pressure;
  Reactor core differential pressure;
  Reactor building pressure;
  Pressurizer water level;
  Steam generator water level; and
  Boiler feedline pressure.

The incorrect measurements or failure of sensors can cause undesirable consequences associated with the safety shutdown systems. Sensors may malfunction due to bias, drifts, precision degradation, or even complete failures. Errors may also be introduced during the transmission of measurement signals, which for example may be current or voltage signals.

In the safety shutdown systems of NPPs, wired sensors are used to measure and transmit trip variables. The inaccuracy or failure of the wired sensors could lead to serious consequences because a safety shutdown system relies on the accuracy of those transmitted measurements. If the reactor is spuriously tripped, a significant economic loss may be incurred because the process to restart a NPP can take over 48 hours due to reactor poison-out. The alternative is that the sensors fail to detect a malfunction and serious harm to the NPP facilities, the environment, and/or the public may occur. Therefore, ensuring the measurement reliability, accuracy, and precision of the sensors in a NPP safety shutdown system is of crucial importance.

Currently, various strategies have been taken to address the potential inaccuracy or failure of sensors in safety shutdown systems: 1) the use of 2-out-of-3 or 2-out-of-4 logic, so that the measurement error or failure of one sensor will not lead to the stop of the chain reaction; 2) the regular testing, inspection, and maintenance of all sensors.

However, these tests have their shortcomings. For example, during the tests, one of the shutdown channels will be taken out of service. As a result, the spurious trip rate will increase. Therefore, the frequencies of the tests should be optimized. Nevertheless, various faults with the sensors can occur between two scheduled tests.

Some industrial facilities have computerized systems to monitor the safety shutdown systems. All the measurements used by the monitoring systems are from wired sensors included in the shutdown systems. The measurements from the sensors for the same trip variable are compared against each other to validate the measurements and to detect possible faults.

Another application example of wired sensors is monitoring levels of storage tanks for liquid such as diesel, gasoline, and waste water. The level measurements from the wired level sensors are transmitted to level display modules through wires. Reliable level measurements are critical to the safe and efficient operation of the storage tanks.

In the prior art, a number of methods and systems to improve the reliability of sensors have been disclosed. U.S. Pat. Nos. 6,594,620, 5,680,409, 5,548,528, and 5,442,562 disclose the process-model-based methods and systems for detecting sensor faults and validating sensors, which require accurate process models. U.S. Pat. No. 7,200,469 discloses an apparatus and method for processing sensor output signals, where two wired sensors are used. U.S. Pat. Nos. 7,359,702, 6,853,887, 5,531,402, 6,236,334, 6,389,321 disclose systems using both wired and wireless communication channels, where the wireless channel is usually used as a backup for the wired channel.

The present invention seeks to overcome the aforementioned deficiencies of the prior art by providing a system and method using wireless sensors to validate wired sensors to improve the reliability of the wired sensors.

SUMMARY OF INVENTION

The present invention provides a method and system using wireless sensors to validate wired sensors in applications where there are stringent requirements on the reliability of the wired sensors. One application example is safety shutdown systems for industrial facilities; the other application example is level monitoring systems for liquid storage tanks. Here, a computing means periodically collects measurements for each variable from the wired and wireless sensors and compares them against an expected value. The expected value is a weighted average of all the measurements for a variable, in which the weight assigned to the measurement from each sensor is determined according to both its reliability and accuracy. If the difference between a measurement and its corresponding expected value is unacceptable or any malfunction with any system component is detected, the computing means will generate an alert.

In a first aspect, the present invention provides a system for validating at least one wired sensor measuring at least one variable comprising: (a) at least one wireless sensor for measuring the at least one variable as an at least one wireless sensor measurement; (b) at least one wired receiver, operatively coupled to the at least one wired sensor, to receive the at least one wired sensor measurement from the at least one wired sensor; (c) at least one wireless receiver, operatively coupled to the wireless sensor to receive the at least one wireless sensor measurement from the at least one wireless sensor; and (d) a computing means, operatively coupled to the at least one wired receiver and the at least one wireless receiver, to compare the at least one wired sensor measurement and/or the at least one wireless sensor measurement to an expected value, such that if at least one measurement is unacceptable, an alert is generated.

In a second aspect, the present invention provides a method for validating at least one wired sensor measuring at least one variable comprising steps of: (a) using at least one wireless sensors and the at least one wired sensors to collect measurements from the at least one variable; (b) calculating a weighted average of all of the measurements taken in step (a) as an expected value; (c) comparing at least one measurement to the expected value; (d) determining whether a difference between the at least one measurement and the expected value is unacceptable; (e) in the event that the difference between the at least one measurement and the expected value is unacceptable, an alert is generated and the method returning to step (a); and (f) in the event that the difference between the at least one measurement and the expected value is not unacceptable, returning to step (a).

In a third aspect, the present invention a system for monitoring and validating a safety shutdown system in a facility through measuring at least one variable comprising: (a) at least one wired sensor for measuring the variable in the facility, wherein at least one wired sensor measurement is used in a shutdown logic; (b) at least one wireless sensor for measuring the variable as an at least one wireless sensor measurement; (c) at least one wired receiver, operatively coupled to the at least one wired sensor, to receive the at least one wired sensor measurement from the at least one wired sensor; (d) at least one wireless receiver, operatively coupled to the wireless sensor to receive the at least one wireless sensor measurement from the at least one wireless sensor; and (e) a computing means, operatively coupled to the at least one wired receiver and the at least one wireless receiver, to compare the at least one wired sensor measurement and the at least one wireless sensor measurement to an expected value, such that if at least one measurement is unacceptable, an alert is generated.

These and further and other aspects, features, and advantages of the invention are made obvious in this disclosure, which includes drawings, descriptions, and claims.

BRIEF DESCRIPTION OF THE DRAWINGS

The embodiments of the present invention will now be described by reference to the following figures, in which identical reference numerals in different figures indicate identical elements and in which.

The figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

DETAILED DESCRIPTION OF THE INVENTION

In this document, the term industrial facility includes manufacturing and process facilities or plants, such as power generation plants, and any other facilities or plants where the present invention may be applied.

Furthermore, the term alert includes alarms and any other physical (i.e., human, mechanical or electrical) output that warns of a danger, threat, or problem, typically with the intention of having it avoided or dealt with.

Figure 1:
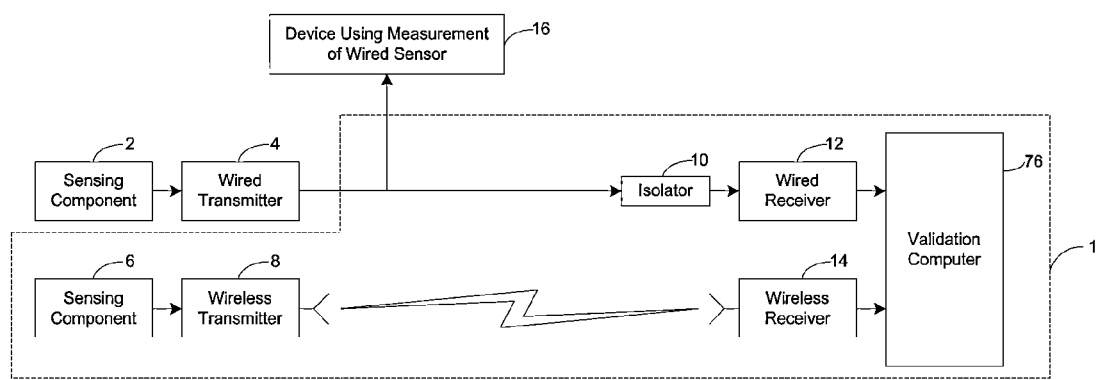
FIG. 1 shows a validation system for a wired sensor in accordance with an embodiment of the present invention.

A validation system according to an embodiment of the present invention is shown in FIG. 1. In FIG. 1, a sensing component 2 and a wired transmitter 4 that together form a wired sensor, whose measurement is sent to a device 16 for the purpose of safety shutdown, control, and/or monitoring. The measurement from the wired sensor is also sent to a validation computer 76 through an isolator 10 and a wired receiver 12. A sensing component 6 and a wireless transmitter 8 together form a wireless sensor, whose measurement is sent to the validation computer 76 through a wireless receiver 14. The validation computer 76 compares the measurements against the corresponding expected value, and issues an alert if an unacceptable difference is detected. The validation system 1 includes the sensing component 6, the wireless transmitter 8, the isolator 10, the wired receiver 12, the wireless receiver 14, and the validation computer 76.

Another embodiment of the present invention provides a method and system to monitor and validate safety shutdown systems for industrial facilities, e.g., NPPs. In this embodiment, wireless sensors are used to measure the trip variables. The measurements taken by the wireless and the wired sensors are transmitted to a main control room. These measurements are then compared against expected values for validation.

From the perspective of monitoring critical variables of industrial facilities, the introduction of the wireless sensors provides backups and improves diversity. The wireless sensors can serve as backups for wired sensors, which may enable the relevant persons to continue to monitor the variables when the wired sensors are not available in cases of accidents such as fire, flood, sabotage, and power loss. The measurements from wireless sensors are transmitted using digital signals, which can be validated at the receivers using various methods, e.g., cyclic redundancy check (CRC). In addition, the wireless sensors may use different measurement mechanisms to further improve the diversity. The diversity helps to provide protection against common mode failures and undetected deficiencies in the design, manufacturing, and installation of the sensors. As a result, the likelihood that all sensors for measuring a specific trip variable provide incorrect readings or fail simultaneously is significantly reduced.

In accordance with the present invention, the wireless sensors and the validation computer are independent from the pre-existing shutdown system in that they are not involved in the shutdown logic directly. Furthermore, isolation techniques may be employed to ensure that the acquisition of measurements from the wired sensors by the validation computer do not affect the pre-existing operation of the comparators with the wired sensors. As a result, the effects of the newly introduced wireless components on the safety shutdown systems are minimized.

Figure 2:
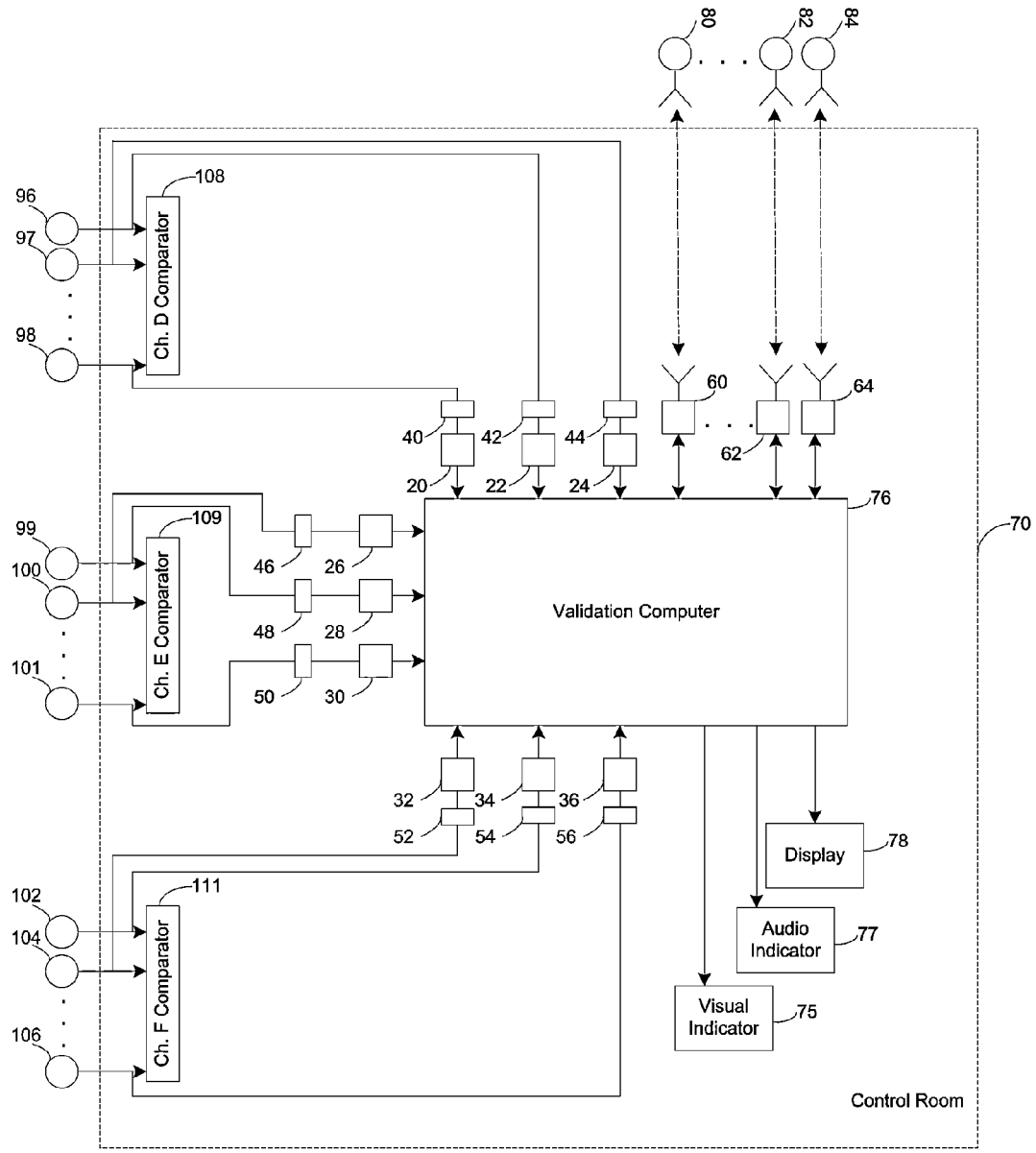
FIG. 2 shows a validation system for the wired sensors used in a safety shutdown system in accordance with one embodiment of the present invention.

Another embodiment of the present invention for validating wired sensors used in a safety shutdown system is shown in FIG. 2. Here, the system includes a validation computer 76 as a computing means. A display 78, an audio indicator 77, and a visual indicator 75 are operatively coupled to the validation computer 76. It should be mentioned that one or more of the display and the indicators are optional elements of the present invention.

The intended users of the system shown in FIG. 2 are facility personnel inside a main control room 70 that make appropriate decisions and actions based on the alerts generated. However, the personnel may be outside the main control room or operating from a remote site as well.

Referring again to FIG. 2, a number of wireless receivers 60, 62, 64, are operatively coupled to the validation computer 76 and communicate with a number of wireless sensors 80, 82, 84. A group of wired receivers 20, 22, 24, 26, 28, 30, 32, 34, 36 are also operatively coupled to the validation computer 76. These wired receivers 20, 22, 24, 26, 28, 30, 32, 34, 36 are operatively coupled to the wired sensors 96, 97, 98, 99, 100, 101, 102, 104, 106 through a number of isolators 40, 42, 44, 46, 48, 50, 52, 54, 56. The wired sensors 96, 97, 98, 99, 100, 101, 102, 104, 106 are also operatively coupled to a number of comparators 108, 109, 111.

According to one embodiment of the present invention, the wireless receivers 60, 62, 64 communicate with the wireless sensors 80, 82, 84. Depending on the contents and contexts of a message, the method of the present invention determines 1) whether the message is transmitted periodically, 2) the interval between two transmissions, and 3) the priority of the message. The wireless receivers 60, 62, 64 continually update their stored measurements according to the most recent messages from the wireless sensors 80, 82, 84. As a result, the wireless receivers 60, 62, 64 may provide the most recent measurements once they receive the requests from the validation computer 76.

The wired receivers 20, 22, 24, 26, 28, 30, 32, 34, 36 periodically sample the analog signals from the wired sensors 96, 97, 98, 99, 100, 101, 102, 104, 106. The wired receivers 20, 22, 24, 26, 28, 30, 32, 34, 36 provide the validation computer 76 with the most recently sampled measurements once receiving its requests. The isolators 40, 42, 44, 46, 48, 50, 52, 54, 56 may be installed to ensure that the measurements sent from the wired sensors 96, 97, 98, 99, 100, 101, 102, 104, 106 to the validation computer 76 do not affect the operation of the comparators 108, 109, 111 and the wired sensors 96, 97, 98, 99, 100, 101, 102, 104, 106. In a preferred embodiment, the isolators are optocouplers.

In a preferred embodiment, the wireless communication means utilizes spread spectrum signals, e.g., Chirp Spread Spectrum (CSS) signals. Such a communication system has a wide bandwidth, such that the system is more resistant to electromagnetic interference and is able to communicate reliably with low-power signals. Low radiated power of the wireless devices is attractive for use in NPPs, where there are strict regulations on electromagnetic interference. In addition, CRC, encryption and authentication are implemented to ensure the reliability and security of the wireless communication.

Figure 3:
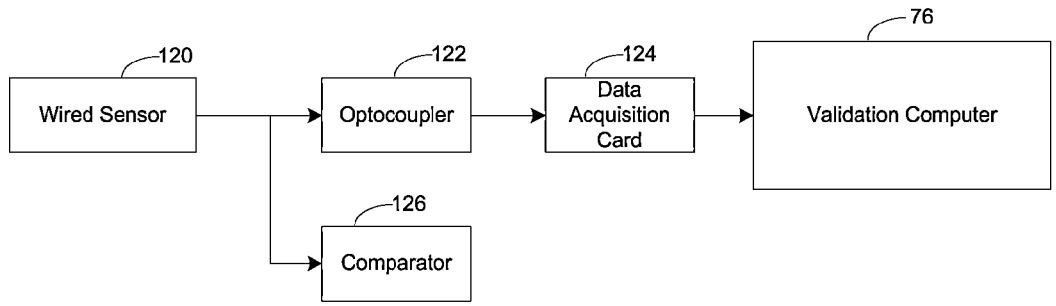
FIG. 3 shows a wired system channel in accordance with one embodiment of the present invention.

FIG. 3 shows a wired system channel in accordance with an embodiment of the present invention. The validation computer 76 includes a data acquisition card 124 to collect the measurements from the wired sensor 120 via the optocoupler 122. The validation computer 76 shown in FIG. 2 is able to collect all the measurements from the wired sensors 96, 97, 98, 99, 100, 101, 102, 104, 106 in parallel to ensure that the samplings of the analog signals are performed at the same time.

Referring back to FIG. 2, the validation computer 76 may be operatively connected to a monitor serving as a visual indicator 75 and a pair of speakers as an audio indicator 77 to serve as output devices. In the case of an alert, the validation computer 76 would send output signals to the monitor and the pair of speakers to generate the alert. A keyboard and a mouse (not shown) may also be operatively coupled to the validation computer 76 to serve as input devices.

Figure 4:
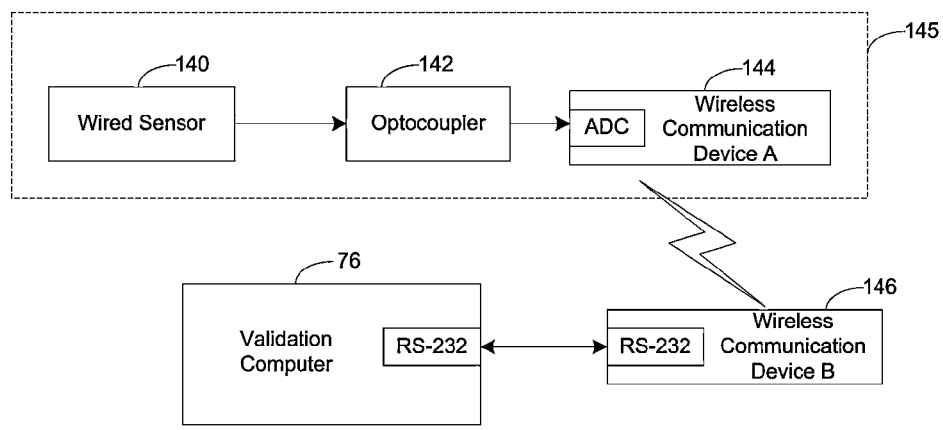
FIG. 4 shows a wireless system channel in accordance with one embodiment of the present invention.

FIG. 4 shows a wireless system channel in accordance with one embodiment of the present invention. Here, two CSS-based wireless communication devices 144, 146 are used to form a point-to-point wireless communication channel. Each wireless communication device 144, 146 includes a microcontroller, a RF module, and an I/O port (each not shown) to receive Analog to Digital Converter (ADC) channel inputs. In one embodiment, each wireless communication device 144, 146 is powered by either two AA alkaline batteries or a 3V direct current (DC) power in-line power supply.

In FIG. 4, the wireless sensor 145 consists of a wired sensor 140 identical to 120, an optocoupler 142 identical to 122, and a wireless communication device A 144. This wireless sensor design is advantageous because the measurements taken by the different sensors for the same variable go through a similar signal route to reduce the possibility of generating false alerts. Then, the wireless communication device B 146 exchanges messages with the validation computer 76 through RS-232 serial communications.

In one exemplary embodiment, the wireless communication system shown in FIG. 4 operates at the 2.4 GHz industrial, scientific and medical (ISM) band. Here, the up-chirps and down-chirps generated by the wireless communication devices 144, 146 have a bit duration of 1 microsecond and an effective bandwidth of 64 MHz. The transmission power can be changed from 7.7 dBm to −32.3 dBm and the receiver sensitivity is −92 dBm at the data rate of 1 Mbit/s.

Figure 5:
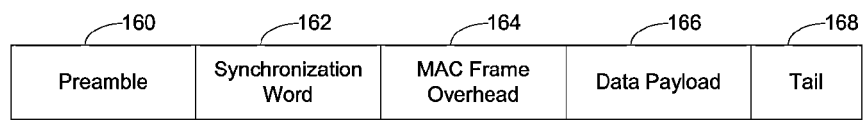
FIG. 5 shows a format of packets used by the wireless communication means of FIG. 4.

FIG. 5 shows a format of packets used by the wireless communication means of FIG. 4 in accordance with one embodiment of the present invention. Here, each packet consists of a preamble 160, a synchronization word 162, a MAC frame overhead 164, a data payload 166, and a tail 168. The size of the packet without the data payload is 276 bits.

Figure 6:
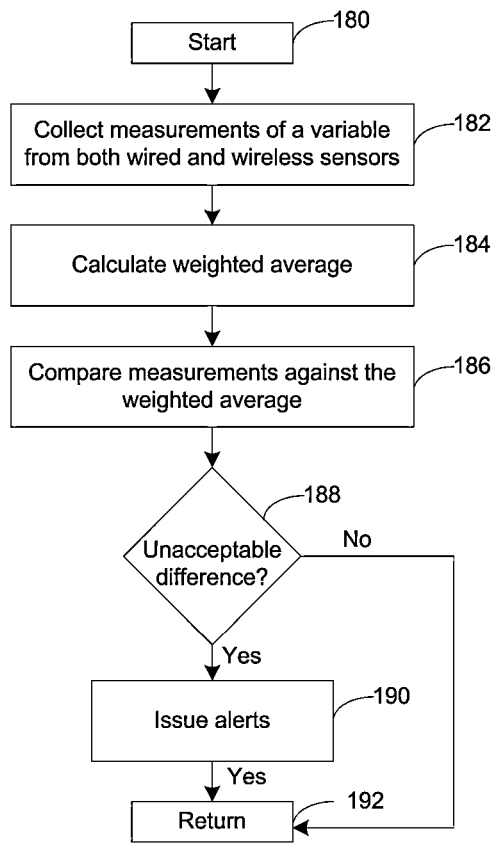
FIG. 6 shows a flowchart diagram of a process for validating the wired sensors in accordance with one embodiment of the present invention.

FIG. 6 shows a flowchart diagram of a process for validating the trip variable measurements in accordance with one embodiment of the present invention. The process starts at step 180. At step 182, the validation computer 76 periodically collects the measurements of each trip variable via the wired and the wireless sensors. It should be mentioned here that all the measurements and the results of the processing and analysis may be shown on the display 78, as shown in FIG. 2.

Next, at step 184, the weighted average is calculated. Here, the expected value of each trip variable is a weighted average of the measurements from all wired and wireless sensors for the variable. The weight of the measurement from each sensor is determined according to its reliability and accuracy. In a preferred embodiment, reliability and accuracy are considered equally in determining the weight. The reliability of a sensor is given by its failure rate and its accuracy is given by its accuracy specifications. Since the reliability and accuracy of a sensor may be different for different measurement ranges, the weight of its measurement may be different as well.

For example, for sensors included in a shutdown channel to measure a steam generator level, it is assumed that the failure rate of the wireless sensor is 10e-6 failure/hour and those of the three wired ones are 3*10e-6 failure/hour. The accuracy specifications of the wireless one are ±1 cm and those of the wired ones are ±2 cm. Then, the weights assigned to the measurements from the wireless and the wired sensors may be calculated as follows:

$$W_{w1} = 0.5 * \frac{\frac{1}{10^{-6}}}{\frac{1}{10^{-6}} + \frac{1}{3*10^{-6}} + \frac{1}{3*10^{-6}} + \frac{1}{3*10^{-6}}} +$$

$$0.5 * \frac{\frac{1}{1}}{\frac{1}{1} + \frac{1}{2} + \frac{1}{2} + \frac{1}{2}} = 0.45$$

$$W_{w} = 0.5 * \frac{\frac{1}{3*10^{-6}}}{\frac{1}{10^{-6}} + \frac{1}{3*10^{-6}} + \frac{1}{3*10^{-6}} + \frac{1}{3*10^{-6}}} +$$

$$0.5 * \frac{\frac{1}{2}}{\frac{1}{1} + \frac{1}{2} + \frac{1}{2} + \frac{1}{2}} = 0.183$$

where $W_{w1}$ and $W_w$ are the weights assigned to the measurements from wireless and wired sensors, respectively.

In step 186, each measurement is then compared against the corresponding expected value, i.e., the weighted average of all measurements for a trip variable. The decision step 188 determines whether there is an unacceptable difference between the measurement and the corresponding expected value. The difference is considered unacceptable if it is larger than a few, e.g., three times the accuracy specifications of the sensor. If the difference is acceptable, the process goes to step 192, which then return the process to the starting step 180. If there is an unacceptable difference, an alert will be generated in step 190, and then the process goes to step 192.

General algorithms to calculate the expected value for a variable used to compare against the measurement of the i-th sensor, denoted $x_{ei}$, are as follows. Assuming there are n sensors measuring the variable (n>1). The measurements of the sensors are $x_1, x_2, \ldots x_n$. The failure rates of the sensors are $f_1, f_2, \ldots f_n$. The accuracies of the sensors are specified with errors $e_1, e_2, \ldots e_n$. $W_1, W_2, \ldots W_n$ are the weights assigned to the measurements of the sensors when calculating $x_{ei}$. $k_f$ is the weight assigned to sensor reliability, and $k_e$ is the weight assigned to sensor accuracy. For the i-th sensor, $$W_i = k_f * \frac{\frac{1}{f_i}}{\frac{1}{f_1} + \frac{1}{f_2} + \ldots + \frac{1}{f_n}} + k_e * \frac{\frac{1}{e_i}}{\frac{1}{e_1} + \frac{1}{e_2} + \ldots + \frac{1}{e_n}}$$

$$x_{ei} = W_1 * x_1 + W_2 * x_2 + \ldots + W_n * x_n$$

If the measurements of all sensors for the variable are used in the algorithms to calculate $x_{ei}$, $x_{e1} = x_{e2} = \ldots = x_{en}$.

Alternatively, $x_i$ itself is not used in the algorithms to calculate $x_{ei}$. In this case, the expected values for the sensors may be different from each other. The success rate of detecting the faults associated with the i-th sensor may increase though the false alert rate may increase as well.

Since the characteristics of the sensors and transmitters for the same trip variable cannot be exactly the same and the measurements are received by the validation computers 76 through different signal paths, noise and significant transients may generate false alerts. To address this issue, the average of measurements collected in step 182 taken over a period of time, e.g., one minute may be used instead.

It should be mentioned further that in accordance with one embodiment of the present invention, the wireless sensors 80, 82, 84 have built-in self-checking and self-diagnostics functions to monitor their own statuses. If any abnormality is detected, e.g., a sensor is faulty, failed, or has run out of power, or a measurement is rapidly increasing or have exceeded the predefined limits, a corresponding message with the highest priority will be transmitted to the corresponding wireless receiver. Once the highest-priority messages arrive at the receiver, they are immediately forwarded to the validation computer 76 for processing. In addition, the statuses of the wireless and wired communications, the validation computer 76, the wireless receivers 60, 62, 64, the display 78, and the indicators 75, 77 are also closely monitored. Some or all trip variables used in the shutdown logic may be addressed by the validation system.

It should also be mentioned that if the validation computer 76 detects any abnormalities or receives any message indicating that there is an abnormality, such as the difference between a measurement and its corresponding expected value is considered unacceptable, a trip variable exceeds predefined limits, or a component fails, it will immediately generate an alert. Depending on the nature of the abnormality, the validation computer 76 will announce the alert on the display 78 and/or activate the visual and audio indicators 75, 77. The facility personnel inside and/or outside the main control rooms may then make appropriate decisions and take appropriate actions. The alerts may also be sent to other relevant plant personnel. The validation computer 76 may also include a database to record all the measurements collected so that further and more in-depth offline analysis can be performed.

Figure 7:
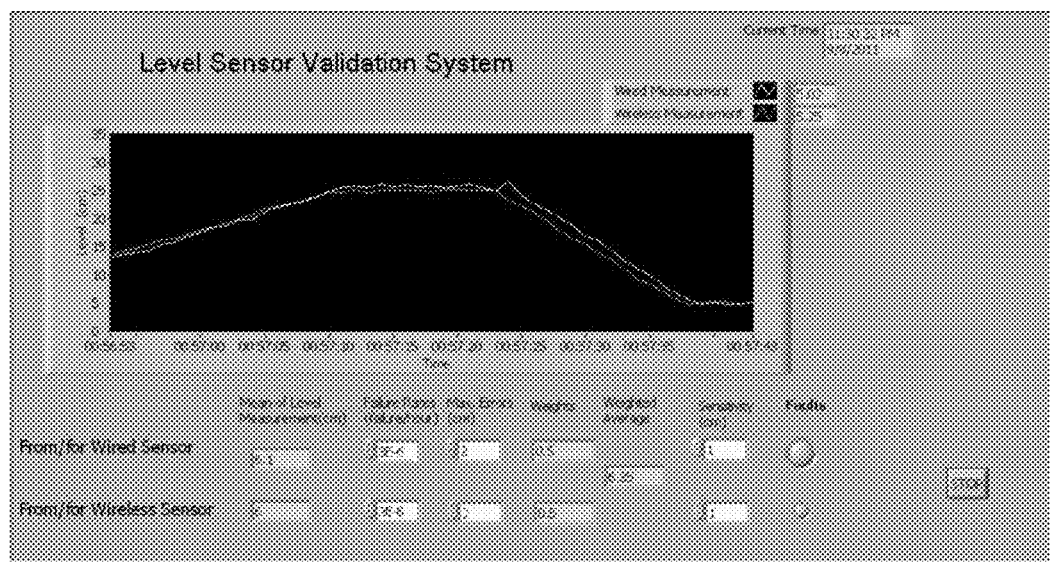
FIG. 7 is a screenshot of a Human Machine Interface (HMI) for one embodiment of the present invention that validates a wired level sensor.

FIG. 7 is a screenshot of a Human Machine Interface (HMI) for a system of the present invention that validates a wired level sensor.

Figure 8:
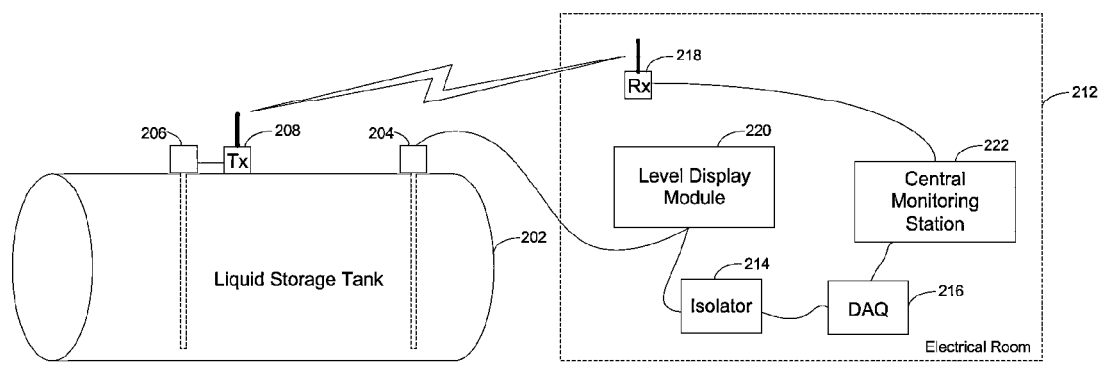
FIG. 8 shows a validation system for the wired sensor used in a system monitoring the level of a liquid storage tank in accordance with an embodiment of the present invention.

FIG. 8 shows a validation system for a wired sensor used in a system monitoring the level of a liquid storage tank in accordance with an embodiment of the present invention. The present invention provides a validation system to validate a wired sensor 204 for monitoring the level of a liquid storage tank 202, as shown in FIG. 8. In FIG. 8, the measurement from the wired liquid level sensor 204 is sent to a level display module 220 located inside an electrical room 212 for the purpose of monitoring. The measurement from the wired sensor is also sent to a central monitoring station 222 located inside an electrical room 212 through an isolator 214 and a data acquisition (DAQ) device 216. A sensing component 206 and a wireless transmitter 208 together form a wireless sensor, whose measurement is sent to the central monitoring station 222 through a wireless receiver 218. The central monitoring station 222 also compares the measurements against the corresponding expected value, and issue an alert if an unacceptable difference is detected. In addition, the central monitoring station 222 displays the measurements from both wired and wireless sensors.

It should be readily understood that the present invention is not limited to measuring liquid levels. Measuring the levels of other substances is also contemplated by the present invention.

It should be mentioned that by utilizing digital wireless communications with CRC, encryption and authentication techniques, the possibility of introducing errors during the transmission of the measurement data is significantly reduced.

Advantageously, the introduction of wireless sensors improves the capabilities of predictive maintenance. Though regular tests, inspections, and maintenance may still be necessary, they may be performed less frequently, and the scope of the tests, inspections, and maintenance may be reduced. The comparisons between measurements and the corresponding expected values also help facility personnel determine when additional tests, inspections, and maintenance are needed and when the wired sensors need to be calibrated or replaced.

Also advantageously, the deployment of wireless sensors does not require the laying of expensive cables. This feature is especially important when deploying the invention in existing facilities where the laying of new wires is usually very difficult if not impossible.

With the increased capabilities of monitoring, validation, diagnostics, and predictive maintenance, the present invention seeks to increase the reliability and availability of those systems using wired sensors.

Although specific embodiments of the invention have been described herein in some detail, it is to be understood that this has been done solely for the purposes of describing the various aspects of the invention, and is not intended to limit the scope of the invention as defined in the claims which follow. Those skilled in the art will understand that the embodiment shown and described is exemplary and various other substitutions, alterations, and modifications, including but not limited to those design alternatives specifically discussed herein, may be made in the practice of the invention without departing from the spirit and scope of the invention.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g."C") or an object oriented language (e.g."C++"). Alternative embodiments of the invention may be implemented as pre-programmed hardware elements, other related components, or as a combination of hardware and software components. Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

What is claimed is:

1. A system, for use in a safety shutdown system in an industrial facility, the system for validating at least one wired sensor measuring at least one variable comprising:

(a) at least one wireless sensor for measuring the at least one variable as an at least one wireless sensor measurement, the at least one wireless sensor having built-in computer-executable instructions for self-checking and self-diagnostics;
(b) at least one wired receiver, operatively coupled to the at least one wired sensor, to receive at least one wired sensor measurement from the at least one wired sensor;
(c) at least one wireless receiver, operatively coupled to the at least one wireless sensor to receive the at least one wireless sensor measurement from the at least one wireless sensor; and
(d) a validation computer, operatively coupled to the at least one wired receiver and the at least one wireless receiver, to compare the at least one wired sensor measurement and the at least one wireless sensor measurement to an expected value, such that if at least one measurement is unacceptable, an alert is generated;
wherein the at least one wired sensor measurement is transmitted to a monitoring device that is independent of the validation computer;
wherein the at least one wireless sensor transmits a message to the at least one wireless receiver whenever an abnormality is detected when the computer-executable instructions are executed;
wherein the at least one wired sensor measurement of the at least one variable is a trip variable used by the monitoring device in a shutdown logic of the safety shutdown system for the industrial facility; and
wherein the at least one wireless sensor has a different measurement mechanism than the at least one wired sensor so as to increase reliability of the safety shutdown system through sensor diversity.

2. The system as in claim 1, wherein the variable is a substance level in a storage tank.

3. The system as in claim 1, wherein the variable is a level in a liquid storage tank.

4. The system as in claim 1, wherein the expected value is a weighted average of all the wired and wireless measurements for the variable.

5. The system as in claim 4, wherein the expected value is determined by assigning a weight to each measurement from each of the at least one wired sensor and the at least one wireless sensor, wherein each assigned weight is determined based on a measured reliability and accuracy of a corresponding sensor.

6. The system as in claim 1, wherein the expected value is a weighted average of all the wired and wireless measurements for the variable, except the measurement which is to be compared against the expected value.

7. The system as in claim 6, wherein the expected value is determined by assigning a weight to each measurement from each of the at least one wired sensor and the at least one wireless sensor, except the measurement which is to be compared against the expected value, wherein each assigned weight is determined based on a measured reliability and accuracy of a corresponding sensor.

8. The system as in claim 1, wherein the at least one wired sensor uses analog signals to transmit measurements.

9. The system as in claim 1, wherein the at least one wireless sensor uses digital signals to transmit measurements.

10. The system as in claim 1, further including an isolator between the validation computer and the at least one wired sensor.

11. The system as in claim 1, further including at least one display that is operatively coupled to the validation computer.

12. The system as in claim 1, further including at least one audio indicator that is operatively coupled to the validation computer.

13. The system as in claim 1, further including at least one visual indicator that is operatively coupled to the validation computer.

14. The system as in claim 1, wherein the validation computer includes a database to record all of the measurements collected.

15. A method, for use in a safety shutdown system in an industrial facility, the method for validating at least one wired sensor measuring at least one variable comprising steps of:
(a) using at least one wireless sensor having built-in computer-executable instructions for self-checking and self-diagnostics, and the at least one wired sensor to collect measurements from the at least one variable;
(b) calculating a weighted average of all of the measurements taken in step (a) as an expected value;
(c) comparing at least one measurement to the expected value;
(d) determining whether a difference between the at least one measurement and the expected value is unacceptable;
(e) in the event that the difference between the at least one measurement and the expected value is unacceptable, an alert is generated and the method returning to step (a); and
(f) in the event that the difference between the at least one measurement and the expected value is acceptable, returning to step (a);
wherein measurements from the at least one variable collected by the at least one wired sensor is transmitted to a monitoring device that is independent of a validation computer performing steps b), c), and d); and
wherein measurements from the at least one variable collected by the at least one wired sensor is a trip variable used by the monitoring device in a shutdown logic of the safety shutdown system for the industrial facility;
wherein the at least one wireless sensor transmits a message to the at least one wireless receiver whenever an abnormality is detected when the computer-executable instructions are executed; and
wherein the at least one wireless sensor has a different measurement mechanism than the at least one wired sensor so as to increase reliability of the safety shutdown system through sensor diversity.

* * * * *